United States Patent Office 3,847,899
Patented Nov. 12, 1974

3,847,899
METHOD FOR MANUFACTURE OF CITRUS BIOFLAVONOIDS
William G. Mitchell, Dade City, Fla., assignor to Lykes Pasco Packing Co., Dade City, Fla.
No Drawing. Filed Jan. 15, 1971, Ser. No. 106,924
Int. Cl. C07g 17/00
U.S. Cl. 260—236.5
5 Claims

ABSTRACT OF THE DISCLOSURE

A method for extracting citrus bioflavonoids from the residues of fruit processing including, in its barest essentials, extraction with an organic solvent, precipitation as a lead salt, and acidifying to form a solution of bioflavonoids followed by concentration.

BACKGROUND OF THE INVENTION

Field of the Invention

This invention relates to a novel method for purifying bioflavonoids and more particularly to a method for the extraction of citrus bioflavonoids from citrus molasses.

Description of the Prior Art

Bioflavonoids comprise a large, fairly homogeneous group of substances. They are characterized by a $C_6$-$C_3$-$C_6$ carbon skeleton, in which the $C_6$ portions are aromatic rings usually carrying various substituents. The oxidation level and other structural features of the $C_3$ carbon chain determine the particular type of flavonoid. In citrus one finds the flavones;

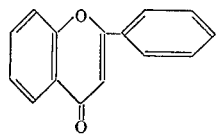

the flavonols;

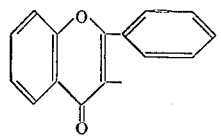

and mostly the flavanones;

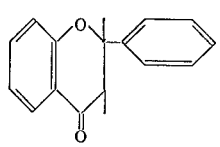

In the manufacture of citrus products for instance orange and grapefruit juices and/or orange and grapefruit concentrates, large quantities of molasses are obtained as a byproduct. Usually molasses is fed to cattle because it consists mainly of sugars. However it contains a number of valuable substances which should be extracted before the sugars are used as cattle feed.

SUMMARY OF THE INVENTION

Objectives

An object of this invention is to provide a novel method for producing bioflavonoids.

Another object is to provide a method for the removal of bioflavonoids from the molasses of plant processing residue.

Still another object is to provide a method for the relatively simple recovery of citrus bioflavonoids from citrus molasses.

A further object is to utilize citrus molasses in a more economical manner.

A still further object is to utilize citrus molasses in a manner wherein pharmaceutical grade chemicals may be extracted from the residue of citrus processing residues.

Another object is to provide a method for producing citrus bioflavonoids which is relatively simple and economical to perform.

Another object is to provide a method for extracting bioflavonoids in soluble form.

Another object is to provide a method for extracting bioflavonoids which does not require voluminous quantities of extractant liquids.

Other objects of the invention will in part be obvious and will in part appear hereinafter.

Broad Description of the Invention

In accord with the above objectives, it has now been found that bioflavonoids may be produced out of the residue of fruit processing by extracting with an organic solvent, concentrating the extract, precipitating the bioflavonoids therein with a lead salt, washing the precipitates and then acidifying it with phosphoric acid to dissolve the bioflavonoids and to precipitate the excess lead, and then concentrating the solution to obtain the bioflavonoids in substantially pure form. More particularly, a water soluble bioflavonoid mixture is extracted one or more times from concentrated citrus press liquor or citrus molasses, with an organic solvent for flavanone glycosides, such as the lower aliphatic alcohols, preferably isopropyl alcohol. Extraction is best accomplished when the alcohol content of the liquid phase is greater than 70%. The alcoholic extracts are combined and concentrated and then the bioflavonoid constituents therein are precipitated with a lead salt under alkaline conditions. The lead salt is then filtered from the liquid, washed with water one or more times, and then acidified with phosphoric acid which dissolves the bioflavonoid and further precipitates the excess lead. The acidified bioflavonoid liquor is then treated with a sulfide to precipitate all traces of lead, which precipitate is then filtered off. The filtrate is then concentrated or completely dried to produce the desired bioflavonoid.

The invention accordingly comprises the several steps and the relation of one or more of such steps with respect to each of the others thereof, which will be exemplified in the method hereinafter disclosed, and the scope of the invention will be indicated in the claims.

DETAILED DESCRIPTION OF PREFERRED EMBODIMENTS

For a fuller understanding of the nature and objects of the invention, reference should be had to the following detailed Examples:

Example I 250 gallons of 80% isopropyl alcohol are placed into a tank fitted with an agitator. 160 gallons of 72° Brix citrus molasses are added. The mixture is well agitated and then allowed to settle until two layers of liquid are sharply separated. The top or alcohol layer is decanted into a holding tank.

240 gallons of 80% alcohol isopropyl is added to the bottom layer and again agitated. The resultant mixture is allowed to settle and the top or alcohol layer is decanted and combined with the first extract in the holding tank. The two extracts are then concentrated in a distillation type evaporator to a manageable Brix such as a 52° Brix concentrated extract.

80 gallons of the 52° Brix concentrated extract is diluted with 55 gallons of water and agitated and the pH of the mixture brought to 7.0 using NaOH. A solution containing 100 pounds of lead acetate is then added with excess agitation. The solution is further diluted with water to 270 gallons. After considerable agitation, about 35 pounds of 50% sodium hydroxide is used to raise the pH to between 7.5 and 9.0. This precipitates the bioflavonoids as a lead complex.

The precipitate is separated and washed several times with water. The washed precipitate is then placed in a tank fitted with an agitator. It is diluted with about 100 gallons of water and then brought to a pH of between 3.0 and 3.3 by the addition of a 60% phosphoric acid solution. This dissolves the bioflavonoids and causes precipitation of a lead phosphate complex. The precipitate is filtered and washed with a small amount of water and the wash liquid is added to the bioflavonoid containing acid solution. The combined liquids are then treated with sodium sulfide to precipitate all trace of lead. The precipitate is filtered through a filter aid. The clean bright filtrate that remains contains the bioflavonoid. It may be concentrated or dried. It is pure enough to be used as a pharmaceutical ingredient.

Example II 200 gallons of 90% isopropyl alcohol are added to an agitator equipped tank. 130 gallons of 72° Brix citrus molasses are added and the mixture well agitated to achieve optimum extraction. The mixture is then allowed to settle until two layers of liquid sharply separate. The top layer is decanted off into a holding tank. The bottom layer is again agitated with another 200 gallons of 90% alcohol. The mixture is again allowed to settle. The top layer is decanted and added to the first extract.

The extracts are concentrated in a distillation type evaporator to collect the alcohol and concentrate the extracted material to about a 52° Brix.

100 gallons of this 52° Brix concentrate is then diluted with 70 gallons of water in an agitator and the pH of the mixture adjusted using sodium hydroxide to a pH of 7.0. A solution containing 130 pounds of lead acetate is then added with mixing and the mixture further diluted with water to 250 gallons. After considerable agitation, about 50 pounds of 50% sodium hydroxide is added to raise the pH to between 7.5 and 9.0.

The resultant precipitate is separated, washed with about 250 gallons water. The washed precipitate is placed in a tank fitted with an agitator. It is diluted with about 100 gallons of water and then brought to a pH of between 3.0 and 3.3 by the addition of 60% phosphoric acid solution. This dissolves the bioflavonoids and causes the formation of a lead phosphate complex. The lead phosphate precipitate is then separated and washed with a small amount of water. The wash water plus the liquor left after the lead phosphate precipitate are treated with sodium sulfide to form lead sulfide of any trace of lead. The lead sulfide precipitate is filtered through a filter aid. The cleaned filtrate is then concentrated or dried as desired.

Example III 500 gallons of n-butyl alcohol are placed into a tank equipped with an agitator and 300 gallons of 68° Brix citrus molasses are added. The mixture is then well agitated to achieve optimum extraction. The mixture is allowed to settle until two layers of liquid are sharply separated. The top or alcohol layer is run off into a holding tank. The bottom layer is once again agitated with a further 500 gallons of n-butyl alcohol. The mixture is allowed to settle until two layers of liquid are sharply separated. The top or alcohol layer is run off into a holding tank. The bottom layer is once again agitated with a further 500 gallons of n-butyl alcohol. The mixture is allowed to settle and the top or alcohol layer is added to the holding tank to mix with the first extract.

The extracts are concentrated in a distillation type evaporator to collect the alcohol and concentrate the extracted material to a manageable Brix. 160 gallons of a 52° Brix concentrated extract is diluted with 110 gallons of water with agitation and the pH of the mixture adjusted using potassium hydroxide to a pH of 7.0.

A solution containing 200 pounds of lead acetate is then added with agitation and the volume is diluted with water to 570 gallons. After vigorous agitation, about 35 pounds of potassium hydroxide is added to raise the pH to between 7.5 and 9.0. The resultant precipitate is separated and thoroughly washed with about 570 gallons of water. The washed precipitate is placed in a tank fitted with an agitator. It is diluted with about 200 gallons of water and then brought to a pH of between 3.0 and 3.3 by the addition of 60% phosphoric acid solution. This causes the formation of a lead phosphate complex and also dissolves the bioflavonoids. The resulting lead phosphate precipitate is then separated and washed with a small amount of water. The washing water plus the separated liquor left after the lead phosphate precititate are treated with calcium sulfide to form lead sulfide of any trace of lead. The lead sulfide precipitate is filtered through a filter aid. The cleaned filtrate is then concentrated or dried as desired.

The lower alcohols ($C_3$–$C_6$) or any organic solvent for flavanone glycosides may be used as the extracting solvent in the process of this invention. Usually a ratio of 2 to 1 to 4 to 1 solvent to citrus fruit residue is used. The percentage of isopropyl alcohol or organic solvent should be such that there is sufficient water to dissolve the bioflavonoids but not more than this because excess water would merely dissolve excess sugar which must be lost later.

The alkalizing agent used to adjust the pH to the alkaline range during the bioflavonoid lead complexing step may be the alkaline and alkaline earth hydroxides, ammonium hydroxide, and similar agents or mixtures thereof. It is used in sufficient quantity to attain the desired pH range indicated in the above examples.

Any soluble lead compound may be utilized to form the bioflavonoid lead complex. Lead acetate is a typical example. It is used in excess to drive the reaction over to the complex side. Actually, the amount of lead salt must be found by experimentation to the extent that an excess is required of almost double that required to just precipitate the amount of bioflavonoid the extract contains.

Any soluble sulfide may be used to remove all trace of the lead. In actual practice, the sulfide is added to a small quantity of the clear liquor and the liquor is then filtered clear. Further sulfide is added again. If another precipitate forms sufficient sulfide was not added in the first place. The measure is therefore that one adds enough sulfide to precipitate all the lead so that the lead content of the finished, dried bioflavonoid compound contains no more than one or two parts per million of lead. Sulfide of sodium, potassium and ammonium are typical examples of solubles sulfides that may be used.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. A method for extracting citrus bioflavonoids from citrus molasses, said method comprising:
   (a) extracting said molasses with an organic solvent for flavanone glycosides;
   (b) concentrating the resultant extract;

(c) precipitating the bioflavonoid constituents in said extract with a lead salt under alkaline conditions;
(d) removing the resultant precipitate by filtration;
(e) acidifying said precipitate with phosphoric acid, thereby dissolving said bioflavonoids and forming a lead phosphate complex precipitate;
(f) separating said lead phosphate complex precipitate by filtration and discarding said lead phosphate complex precipitate;
(g) removing all trace of lead from the remaining bioflavonoid-containing filtrate by adding excess soluble sulfide thereto; and
(h) concentrating the resultant lead-free bioflavonoid solution.

2. The method of claim 1 wherein said organic solvent comprises the lower aliphatic alcohols.

3. The method of claim 2 wherein the lower aliphatic alcohol is isopropyl alcohol.

4. The method of claim 1 wherein said lead salt comprises lead acetate used in excess.

5. The method of claim 1 wherein the soluble sulfide is sodium sulfide.

References Cited

UNITED STATES PATENTS

| | | | |
|---|---|---|---|
| 2,962,515 | 11/1960 | Diczfalusy et al. | 260—210 F |
| 2,984,601 | 5/1961 | Sudarsky et al. | 260—210 F |
| 2,152,827 | 4/1939 | Szent-Gyorgyi | 260—210 F |
| 2,534,250 | 12/1950 | Eds et al. | 260—210 F |

FOREIGN PATENTS

| | | | |
|---|---|---|---|
| 486,898 | 6/1938 | Great Britain | 260—210 F |

JOHNNIE R. BROWN, Primary Examiner

U.S. Cl. X.R.

260—210 F